United States Patent
Stahr et al.

(10) Patent No.: US 11,491,962 B2
(45) Date of Patent: Nov. 8, 2022

(54) HYDRAULIC BRAKING SYSTEM FOR A VEHICLE AND CORRESPONDING OPERATING METHOD

(71) Applicant: Robert Bosch GmbH, Stuttgart (DE)

(72) Inventors: Wolf Stahr, Abstatt (DE);
Massimiliano Ambrosi, Abstatt (DE);
Michael Eisenlauer, Affalterbach (DE);
Edgar Kurz, Heilbronn-Horkheim (DE); Wolfgang Schuller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 16/770,258

(22) PCT Filed: Dec. 7, 2018

(86) PCT No.: PCT/EP2018/083910
§ 371 (c)(1),
(2) Date: Jun. 5, 2020

(87) PCT Pub. No.: WO2019/121054
PCT Pub. Date: Jun. 27, 2019

(65) Prior Publication Data
US 2021/0162975 A1 Jun. 3, 2021

(30) Foreign Application Priority Data
Dec. 21, 2017 (DE) ..................... 10 2017 223 498.9

(51) Int. Cl.
*B60T 13/68* (2006.01)
*B60T 13/14* (2006.01)
(Continued)

(52) U.S. Cl.
CPC .......... *B60T 13/686* (2013.01); *B60T 13/142* (2013.01); *B60T 13/148* (2013.01); *B60T 15/028* (2013.01);
(Continued)

(58) Field of Classification Search
CPC .. B60T 13/686; B60T 13/142; B60T 2270/88; B60T 13/148; B60T 17/221; B60T 15/028
See application file for complete search history.

(56) References Cited

U.S. PATENT DOCUMENTS

| 5,556,175 | A | * | 9/1996 | Hayakawa | ............ | B60T 8/5037 |
| | | | | | | 303/119.2 |
| 6,364,430 | B1 | * | 4/2002 | Park | ........................ | B60T 8/363 |
| | | | | | | 303/119.2 |

(Continued)

FOREIGN PATENT DOCUMENTS

| DE | 10 2013 217 106 A1 | 3/2015 |
| JP | 2006-111208 A | 4/2006 |
| WO | 2014/158993 A1 | 10/2014 |

OTHER PUBLICATIONS

Translation of German Patent No. DE 102013217106 obtained from website: https://worldwide.espacenet.com on Feb. 23, 2022.*

(Continued)

*Primary Examiner* — Pamela Rodriguez
(74) *Attorney, Agent, or Firm* — Maginot, Moore & Beck LLP

(57) ABSTRACT

A hydraulic braking system for a vehicle includes a master brake cylinder, a hydraulic unit and a plurality of wheel brakes, the hydraulic unit including at least one brake circuit for brake pressure modulation in the wheel brakes. A bistable solenoid valve is associated with at least one wheel brake, which valve is looped into the corresponding fluid channel, immediately upstream of the associated wheel brake, and in a de-energized open position enables brake (Continued)

pressure modulation in the associated wheel brake, and in a de-energized closed position seals a current brake pressure in the associated wheel brake, wherein a hydraulic force brought about by the sealed-in brake pressure acts in a seat-opening manner in the corresponding bistable solenoid valve.

11 Claims, 2 Drawing Sheets

(51) Int. Cl.
 *B60T 15/02* (2006.01)
 *B60T 17/22* (2006.01)
(52) U.S. Cl.
 CPC ......... *B60T 17/221* (2013.01); *B60T 2270/88* (2013.01)

(56) References Cited

U.S. PATENT DOCUMENTS

| | | | |
|---|---|---|---|
| 10,994,717 B2 * | 5/2021 | Stahr | B60T 8/363 |
| 2003/0042452 A1 | 3/2003 | Burke | |
| 2014/0264113 A1 | 9/2014 | Grover | |
| 2016/0298786 A1 * | 10/2016 | Suzuki | F16H 61/0251 |
| 2017/0261113 A1 * | 9/2017 | Sato | B60T 15/36 |
| 2018/0340625 A1 * | 11/2018 | Kurz | F16K 31/082 |
| 2019/0178409 A1 * | 6/2019 | Kurz | F16K 27/029 |
| 2020/0055509 A1 * | 2/2020 | Stahr | H01F 7/127 |
| 2021/0078554 A1 * | 3/2021 | Baehrle-Miller | B60T 13/686 |

OTHER PUBLICATIONS

International Search Report corresponding to PCT Application No. PCT/EP2018/083910, dated Mar. 1, 2019 (German and English language document) (5 pages).

* cited by examiner

HYDRAULIC BRAKING SYSTEM FOR A VEHICLE AND CORRESPONDING OPERATING METHOD

This application is a 35 U.S.C. § 371 National Stage Application of PCT/EP2018/083910, filed on Dec. 7, 2018, which claims the benefit of priority to Serial No. DE 10 2017 223 498.9, filed on Dec. 21, 2017 in Germany, the disclosures of which are incorporated herein by reference in their entirety.

The disclosure proceeds from a hydraulic brake system for a vehicle and a corresponding operating method for a brake system of this type.

BACKGROUND

Hydraulic brake systems for vehicles with a brake master cylinder, a hydraulic unit and a plurality of wheel brakes are known from the prior art, which hydraulic brake systems comprises various safety systems, such as an anti-lock brake system (ABS), electronic stability program (ESP), etc., and can carry out various safety functions, such as an anti-lock braking function, a traction control function (ASR), etc. Via the hydraulic unit, control and/or regulating operations can be carried out in the anti-lock brake system (ABS) or in the traction control system (ASR system) or in the electronic stability program system (ESP system) for the build-up and dissipation of pressure in the corresponding wheel brakes. In order to carry out the control and/or regulating operations, the hydraulic unit comprises solenoid valves which are usually held in distinct positions on account of the forces of "magnetic force", "spring force" and "hydraulic force" which act in opposite directions. Accordingly, there are the valve types of "normally open" and "normally closed". In addition, bistable solenoid valves are known which change their state in the case of every energization and remain in said state even without a holding current until the next energization.

SUMMARY

The hydraulic brake system for a vehicle with the features disclosed herein and the corresponding operating method for a hydraulic brake system disclosed herein have the advantage that a bistable solenoid valve which changes between the stable states of "open" and "closed" in the case of energization is used, in order to shut in or enclose a current brake pressure in an associated wheel brake. Since the volume of a corresponding brake fluid is greatly temperature-dependent, great pressure fluctuations of the brake pressure which is enclosed in the corresponding wheel brake can occur as a result of temperature changes. In embodiments of the disclosure, pressure changes of the brake pressure which is enclosed in a wheel brake which can be produced, for example, as a result of temperature changes of this type can be equalized in an advantageous way.

Embodiments of the present disclosure provide a hydraulic brake system for a vehicle, with a brake master cylinder, a hydraulic unit and a plurality of wheel brakes, the hydraulic unit comprising at least one brake circuit for brake pressure modulation in the wheel brakes. Here, at least one wheel brake is assigned a bistable solenoid valve which is looped into the corresponding fluid duct directly upstream of the associated wheel brake and, in a currentless open position, enables the brake pressure modulation in the associated wheel brake and, in a currentless closed position, encloses a current brake pressure in the associated wheel brake. In addition, a hydraulic force which is brought about by way of the enclosed brake pressure has a seat-opening effect in the corresponding bistable solenoid valve.

In addition, an operating method is proposed for a hydraulic brake system of this type which, in the case of a pressure holding function, switches the bistable solenoid valve which is assigned to the at least one wheel brake into the currentless closed position and encloses a current brake pressure in the associated wheel brake, a hydraulic force which is brought about by way of the enclosed brake pressure having a seat-opening effect in the corresponding bistable solenoid valve.

By way of the bistable solenoid valve, an additional function can be realized with low additional complexity on a usually present hydraulic unit with an ESP functionality, which additional function can enclose a current brake pressure in the corresponding wheel brake electrohydraulically and can hold it over a relatively long time period with a relatively low energy requirement. This means that the existing pressure supply, the pipelines from the hydraulic unit as far as the wheel brakes, and sensor and communications signals can be used not only for the ESP function and/or ABS function and/or ASR function, but rather also for an electrohydraulic pressure holding function in the wheel brakes. As a result, costs, installation space, weight and wiring can be saved in an advantageous way, with the positive effect that the complexity of the brake system is reduced.

As a result of the indicated connection of the solenoid valve, the pressure which is shut in the wheel brake has a seat-opening effect. This means that the hydraulic force which is produced by virtue of the fact that the enclosed pressure acts on the projected area of the sealing diameter presses the sealing element out of its sealing seat counter to a counterforce. Therefore, the hydraulic force assists a magnetic force which is generated by a magnet assembly during opening of the bistable solenoid valve. Therefore, in the case of embodiments of the disclosure in contrast to a connection of the bistable solenoid valve, in the case of which connection the pressure which is shut in the wheel brake has a seat-closing effect, no counterpressure has to be generated via a fluid pump, in order thus to produce a pressure equalization when the bistable solenoid valve is to be opened. Since the bistable solenoid valve is looped into the corresponding fluid duct directly upstream of the associated wheel brake, the possible leakage points can be reduced in an advantageous way. Advantageous improvements of the hydraulic brake system for a vehicle and the operating method for a hydraulic brake system are possible as a result of the measures and developments described herein.

It is particularly advantageous that the bistable solenoid valve can have a positive pressure function which opens the bistable solenoid valve in the currentless closed position and brings about a pressure equalization if the brake pressure which is enclosed in the corresponding wheel brake exceeds a predefined first threshold value. If the enclosed brake pressure rises on account of the temperature change, the positive pressure escapes if the predefined first threshold value of, for example, 90 bar is reached. Therefore, the system is protected against destruction as a result of positive pressure without expensive additional measures. Since the hydraulic force no longer has a seat-closing effect, but rather a seat-opening effect, a counterpressure does not first of all have to be generated by way of the fluid pump in order to open the bistable solenoid valve.

In one advantageous refinement of the hydraulic brake system, in the currentless closed position of the bistable solenoid valve, a predefinable spring force acts in a seat-closing manner counter to the hydraulic force. As a result, the first threshold value of the positive pressure function for the enclosed brake pressure can be set simply via the predefinable spring force. In addition, a decreasing brake pressure which is caused, for example, by way of leakage or temperature decrease, brings about an increase in the excess force of the spring force with a closing effect with regard to the hydraulic force which decreases with the brake pressure.

In a further advantageous refinement of the hydraulic brake system, the bistable solenoid valve can have a negative pressure function which can open the bistable solenoid valve in the currentless closed position, and can bring about a pressure build-up in the corresponding wheel brake via a fluid pump if the brake pressure which is enclosed in the corresponding wheel brake undershoots a predefined second threshold value. This means that the brake pressure in the corresponding wheel brake is increased again if the enclosed brake pressure undershoots the second threshold value by, for example, 30 bar.

In a further advantageous refinement of the hydraulic operating method, in the currentless closed position, the bistable solenoid valve (10) can be opened in order to implement a positive pressure function and a pressure equalization can be brought about if the brake pressure which is enclosed in the corresponding wheel brake exceeds a predefined first threshold value. The first threshold value can correspond to a maximum permitted enclosed brake pressure in the corresponding wheel brake. Here, the first threshold value can be set via the predefined seat-closing spring force which acts counter to the hydraulic force and corresponds to a hydraulic force which acts in the case of the maximum permitted enclosed brake pressure which is calculated from the enclosed brake pressure and a sealing diameter of a corresponding valve seat of the bistable solenoid valve. This means that a compression spring of the bistable solenoid valve which acts in the closing direction is selected in such a way that the spring properties of the compression spring provide the desired spring force.

In a further advantageous refinement of the operating method, the brake pressure which is enclosed in the wheel brake can be measured. As a result, a fluid pump can be activated and the bistable solenoid valve can be opened, in order to carry out a negative pressure function and to build up brake pressure in the corresponding wheel brake if the brake pressure which is enclosed in the wheel brake falls below a predefined second threshold value.

One exemplary embodiment of the disclosure is shown in the drawing and will be described in greater detail in the following description. In the drawing, identical designations denote components or elements which carry out identical or analogous functions.

DETAILED DESCRIPTION

Figure 1:
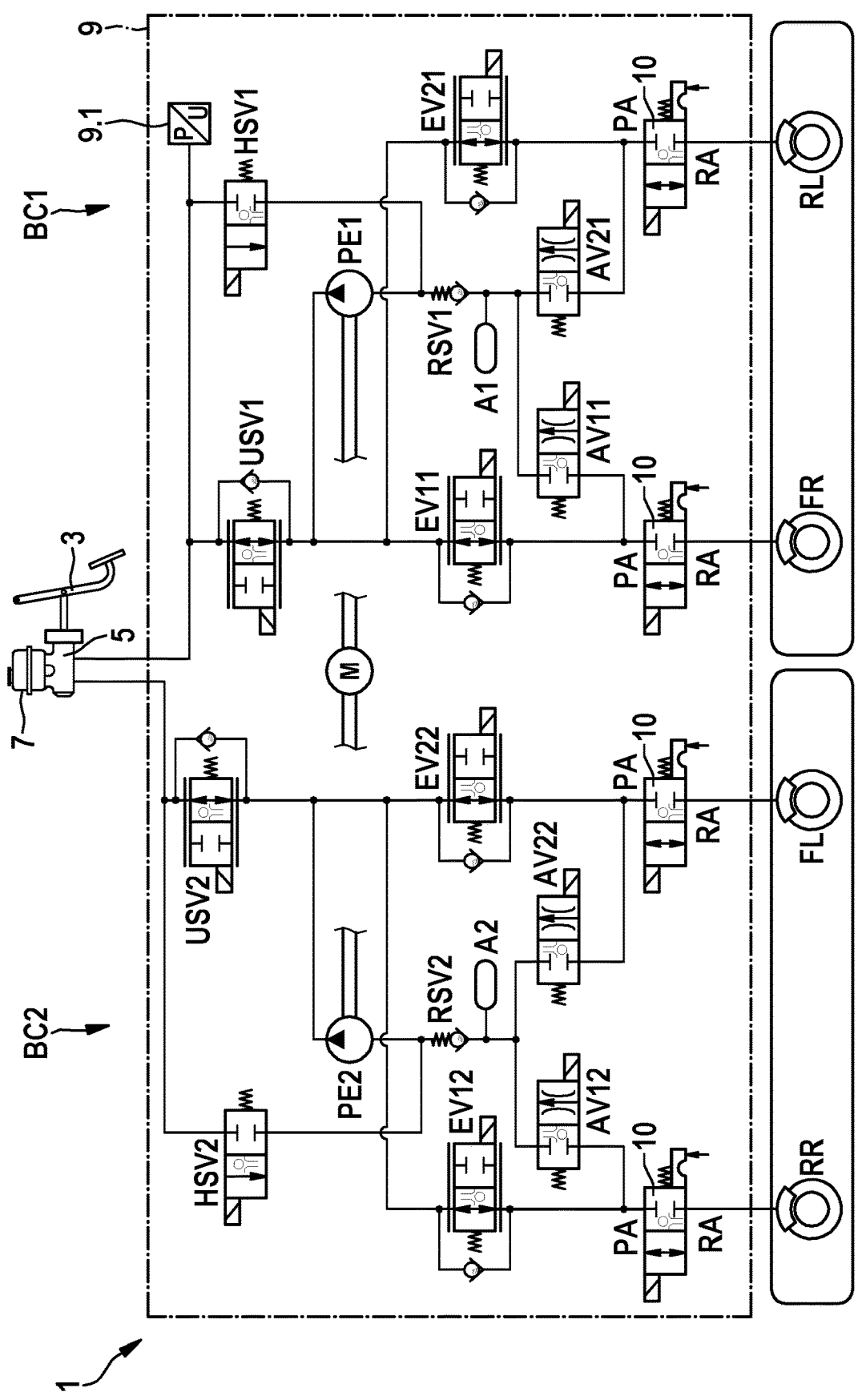
FIG. 1 shows a diagrammatic hydraulic circuit diagram of a first exemplary embodiment of a hydraulic brake system according to the disclosure for a vehicle.
Figure 2:
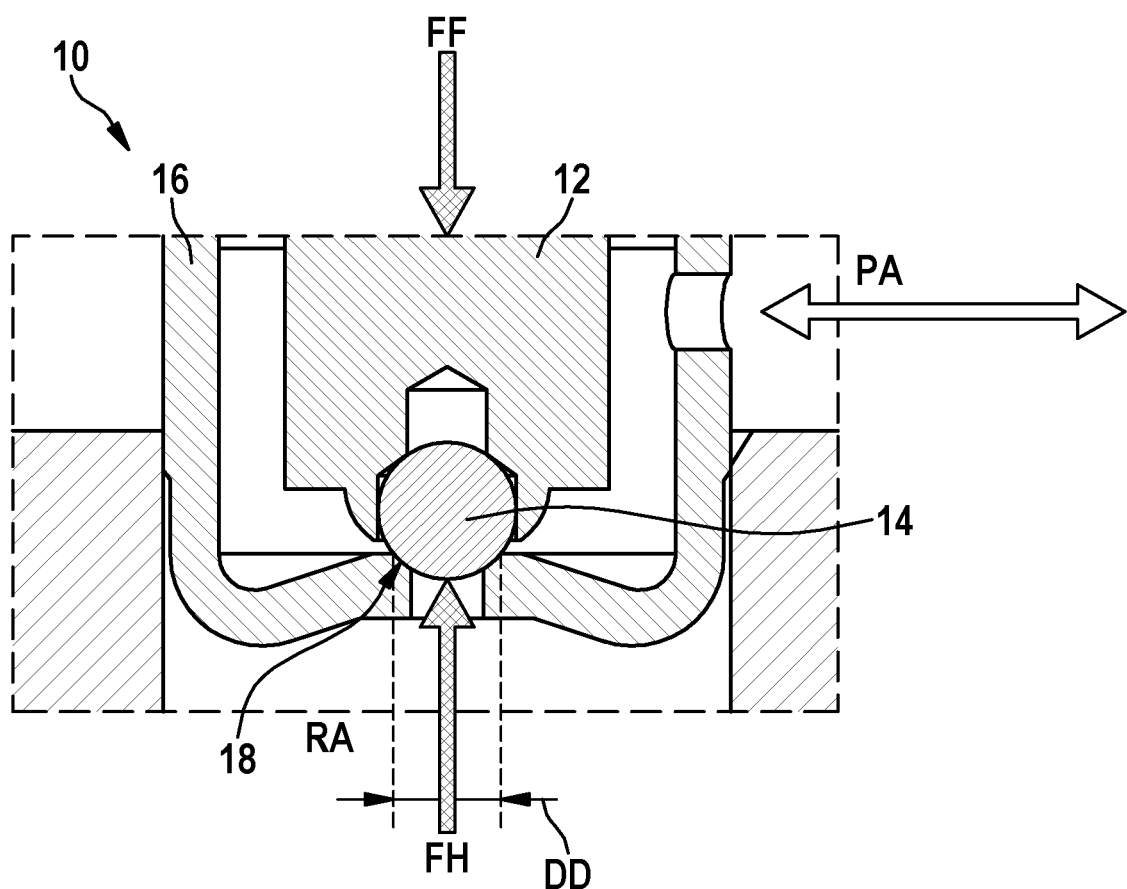
FIG. 2 shows a diagrammatic sectional illustration of a detail of a bistable solenoid valve of the hydraulic brake system according to the disclosure for a vehicle from FIG. 1.

As can be seen from FIGS. 1 and 2, the exemplary embodiment shown of a hydraulic brake system 1 according to the disclosure for a vehicle comprises a brake master cylinder 5, a hydraulic unit 9 and a plurality of wheel brakes RR, FL, FR, RL. For the brake pressure modulation in the wheel brakes RR, FL, FR, RL, the hydraulic unit 9 comprises at least one brake circuit BC1, BC2. Here, at least one wheel brake RR, FL, FR, RL is assigned a bistable solenoid valve BM which is looped into the corresponding fluid duct directly upstream of the associated wheel brake RR, FL, FR, RL, and enables the brake pressure modulation in the associated wheel brake RR, FL, FR, RL in a currentless open position and encloses a current brake pressure in the associated wheel brake RR, FL, FR, RL in a currentless closed position, a hydraulic force FH which is brought about by way of the enclosed brake pressure having a seat-opening effect in the corresponding bistable solenoid valve 10.

Furthermore, as can be seen from FIG. 1, the exemplary embodiment which is shown of the hydraulic brake system 1 according to the disclosure for a vehicle comprises two brake circuits BC1, BC2 which are assigned in each case two of four wheel brakes RR, FL, FR, RL. Thus, a first wheel brake FR which is arranged, for example, on a vehicle front axle on the right hand side and a second wheel brake RL which is arranged, for example, on a vehicle rear axle on the left hand side are assigned to a first brake circuit BC1. A third wheel brake RR which is arranged, for example, on a vehicle rear axle on the right hand side and a fourth wheel brake FL which is arranged, for example, on the vehicle front axle on the left hand side are assigned to a second brake circuit BC2. Each wheel brake RR, FL, FR, RL is assigned an inlet valve EV11, EV21, EV12, EV22 and an outlet valve AV11, AV21, AV12, AV22, it being possible in each case for pressure to be built up in the corresponding wheel brake RR, FL, FR, RL via the inlet valves EV11, EV21, EV12, EV22, and it being possible in each case for pressure to be dissipated in the corresponding wheel brake RR, FL, FR, RL via the outlet valves AV11, AV21, AV12, AV22. For the build-up of pressure in the respective wheel brake RR, FL, FR, RL, the corresponding inlet valve EV11, EV12, EV21, EV22 is opened and the corresponding outlet valve AV11, AV12, AV21, AV22 is closed. For the dissipation of pressure in the respective wheel brake RR, FL, FR, RL, the corresponding inlet valve EV11, EV21, EV12, EV22 is closed and the corresponding outlet valve AV11, AV21, AV12, AV22 is opened.

Furthermore, as can be seen from FIG. 1, the first wheel brake FR is assigned a first inlet valve EV11 and a first outlet valve AV11, the second wheel brake RL is assigned a second inlet valve EV2*l* and a second outlet valve AV21, the third wheel brake RR is assigned a third inlet valve EV12 and a third outlet valve AV12, and the fourth wheel brake FL is assigned a fourth inlet valve EV22 and a fourth outlet valve AV22. Control and/or regulation operations for implementing an ABS function can be carried out via the inlet valves EV11, EV21, EV12, EV22 and the outlet valves AV11, AV21, AV12, AV22.

In addition, the first brake circuit BC1 has a first intake valve HSV1, a first system pressure control valve USV1, a first equalization container A1 with a first check valve RSV1, and a first fluid pump PE1. The second brake circuit BC2 has a second intake valve HSV2, a second system pressure control valve USV2, a second equalization container A2 with a second check valve RSV2, and a second fluid pump PE2, the first and second fluid pump PE1, PE2 being driven by a common electric motor M. Furthermore, the hydraulic unit 9 comprises a sensor unit 9.1 for the determination of the current system pressure or brake pressure. For the brake pressure modulation and for the implementation of an ASR function and/or an ESP function, the hydraulic unit 9 uses, in the first brake circuit BC1, the first system pressure control valve USV1, the first intake valve HSV1 and the first recirculating pump PE1 and, in the second brake circuit BC2, the second system pressure control valve USV2, the second intake valve HSV2 and the second recirculating pump PE2. Furthermore, as can be seen from FIG. 1, each brake circuit BC1, BC2 is connected to the brake master cylinder 5 which can be actuated via a brake pedal 3. In addition, a fluid container 7 is connected to the brake master cylinder 5. The intake valves HSV1, HSV2 make an intervention in the brake system possible, without there being a driver's request. To this end, the respective suction path for the corresponding fluid pump PE1, PE2 to the brake master cylinder 5 is opened via the intake valves HSV1, HSV2, with the result that said corresponding fluid pump PE1, PE2 can provide the required pressure for the regulation instead of the driver. The system pressure control valves USV1, USV2 are arranged between the brake master cylinder 5 and at least one associated wheel brake RR, FL, FR, RL, and set the system pressure or brake pressure in the associated brake circuit BC1, BC2. Furthermore, as can be seen from FIG. 1, a first system pressure control valve USV1 sets the system pressure or brake pressure in the first brake circuit BC1, and a second system pressure control valve USV2 sets the system pressure or brake pressure in the second brake circuit BC2.

Furthermore, as can be seen from FIG. 1, in the case of the exemplary embodiments which are shown, four bistable solenoid valves 10 are looped into the respective fluid duct in each case directly upstream of an associated wheel brake RR, FL, FR, RL. Furthermore, as can be seen from FIG. 2, the individual bistable solenoid valves 10 in each case comprise an axially movable plunger 12 with a sealing element 14 which is configured as a ball in the exemplary embodiment which is shown and, in the closed state, interacts with a sealing seat 18 which is configured at the edge of a through bore of a valve body 14. In the exemplary embodiment which is shown, the valve body 14 is configured as a hat-shaped sleeve. In order to implement the seat-closing effect of the hydraulic force FH, a seat-side connector of the bistable solenoid valve 10 is configured as a wheel connector and is connected to the corresponding wheel brake RR, FL, FR, RL. A sealing element-side connector of the bistable solenoid valve 10 is configured as a pump connector and is connected to a corresponding fluid pump PE1, PE2.

Furthermore, as can be seen from FIG. 2, a predefinable spring force FF has a seat-closing effect counter to the hydraulic force FH in the currentless closed position of the bistable solenoid valve 10 which is shown. As a result, a positive pressure function for the bistable solenoid valve 10 can be provided simply, which positive pressure function opens the bistable solenoid valve 10 in the currentless closed position and brings about a pressure equalization if the brake pressure which is enclosed in the corresponding wheel brake RR, FL, FR, RL exceeds a predefined first threshold value. The first threshold value of the positive pressure function for the enclosed brake pressure can be set via the predefined spring force FF. To this end, the bistable solenoid valve 10 is configured in such a way that the spring force FF holds the bistable solenoid valve 10 closed up to a desired brake pressure, of 90 bar, for example. If the brake pressure rises, for example, as a result of a temperature increase, the positive pressure escapes and flows through the corresponding inlet valve EV11, EV21, EV12, EV22 and the corresponding system pressure control valve USV1, USB2 into the fluid container 7 until the first threshold value of 90 bar which is defined by way of the spring force FF is undershot again. In this way, the system is protected against destruction as a result of positive pressure without expensive additional measures.

In the exemplary embodiment which is shown, the bistable solenoid valve 10 has a negative pressure function which opens the bistable solenoid valve 10 in the currentless closed position and brings about a pressure build-up in the corresponding wheel brake RR, FL, FR, RL via a corresponding fluid pump PE1, PE2 if the brake pressure which is enclosed in the corresponding wheel brake RR, FL, FR, RL undershoots a predefined second threshold value. If the brake pressure which is enclosed in the wheel brake RR, FL, FR, RL drops, for example on account of a leak at the sealing seat 18, the hydraulic force FH which acts also drops, with the result that the excess of the spring force FF which has a closing action and reduces leakage rises. If the brake pressure which is enclosed in the wheel brake RR, FL, FR, RL drops below the second threshold value of, for example, 30 bar, the brake pressure in the corresponding wheel brake RR, FL, FR, RL can be increased via the corresponding fluid pump PE1, PE2, and the bistable solenoid valve 10 can be closed again subsequently, in order to enclose or shut in the brake pressure which has built up again in the corresponding wheel brake RR, FL, FR, RL.

By way of the measures which are described, the brake pressure which is required for a pressure holding function can be set in the corresponding wheel brake RR, FL, FR, RL between 30 bar and 90 bar.

In accordance with embodiments of the operating method according to the disclosure, in the case of the pressure holding function, the bistable solenoid valve 10 which is assigned to the at least one wheel brake RR, FL, FR, RL can be switched into the currentless closed position, and a current brake pressure can be enclosed in the associated wheel brake RR, FL, FR, RL, a hydraulic force FH which is brought about by way of the enclosed brake pressure having a seat-opening effect in the corresponding bistable solenoid valve 10. In order to implement the positive pressure function, the bistable solenoid valve 10 is opened in the currentless closed position and brings about a pressure equalization if the brake pressure which is enclosed in the corresponding wheel brake RR, FL, FR, RL exceeds the predefined first threshold value. Here, the first threshold value corresponds to a maximum permitted enclosed brake pressure in the corresponding wheel brake RR, FL, FR, RL. The first threshold value is set via the predefined seat-closing spring force FF which acts counter to the hydraulic force FH and corresponds to a hydraulic force FH which acts in the case of the maximum permitted enclosed brake pressure. The hydraulic force which acts is calculated from the enclosed brake pressure and a sealing diameter DD of the corresponding valve seat 18 of the bistable solenoid valve 10.

In order to improve the operating method, the brake pressure which is enclosed in the wheel brake RR, FL, FR, RL is measured. As a result, the negative pressure function can also be implemented which activates a fluid pump PE1, PE2 and opens the bistable solenoid valve 10, in order to build up brake pressure in the corresponding wheel brake RR, FL, FR, RL if the brake pressure which is enclosed in the wheel brake RR, FL, FR, RL drops below the predefined second threshold value.

Embodiments of the present disclosure provide a hydraulic brake system for a vehicle, which hydraulic brake system comprises the additional function of electrohydraulic pressure holding in the wheel brakes with low additional complexity of the hydraulic unit. Here, embodiments of the hydraulic brake system are protected against destruction as a result of positive pressure in an advantageous way without expensive additional measures.

The invention claimed is:

1. A hydraulic brake system for a vehicle, comprising:
   a brake master cylinder;
   a plurality of wheel brakes;
   a hydraulic unit comprising at least one brake circuit configured to modulate brake pressure in the wheel brakes; and
   a bistable solenoid valve assigned to at least one wheel brake of the plurality of wheel brakes, the bistable solenoid valve looped into a corresponding fluid duct directly upstream of the associated wheel brake, the bistable solenoid valve having a currentless open position in which the bistable solenoid valve enables the brake pressure modulation in the associated wheel brake, and a currentless closed position in which the bistable solenoid valve encloses a current brake pressure in the associated wheel brake and the enclosed brake pressure produces a hydraulic force acting in an opening direction on the bistable solenoid valve.

2. The hydraulic brake system as claimed in claim 1, wherein the bistable solenoid valve has a positive pressure function such that when the bistable solenoid valve is in the currentless closed position and in response to the enclosed brake pressure exceeding a predefined first threshold value, the hydraulic force causes the bistable solenoid valve to open so as to bring about a pressure equalization.

3. The hydraulic brake system as claimed in claim 2, wherein the bistable solenoid valve includes a spring configured, in the currentless closed position of the bistable solenoid valve, to act with a predefinable spring force in a closing direction of the bistable solenoid valve, counter to the hydraulic force.

4. The hydraulic brake system as claimed in claim 3, wherein the predefinable spring force defines the predefined first threshold value of the positive pressure function.

5. The hydraulic brake system as claimed in claim 1, wherein the hydraulic brake system has a negative pressure function such that when the bistable solenoid valve is in the currentless closed position and in response to the enclosed brake pressure being less than a predefined second threshold value, pressure is increased in the corresponding wheel brake via a fluid pump.

6. An operating method for a hydraulic brake system that has a brake master cylinder, a plurality of wheel brakes, a hydraulic unit comprising at least one brake circuit configured to modulate brake pressure in the wheel brakes, and a bistable solenoid valve assigned to at least one wheel brake of the plurality of wheel brakes, the bistable solenoid valve looped into a corresponding fluid duct directly upstream of the associated wheel brake, the bistable solenoid valve having a currentless open position in which the bistable solenoid valve enables the brake pressure modulation in the associated wheel brake, the method comprising:
   conducting a pressure holding function in which the bistable solenoid valve is switched into a currentless closed position and a current brake pressure is enclosed in the associated wheel brake,
   wherein, in the currentless closed position, a hydraulic force which is brought about by way of the enclosed brake pressure acts in an opening direction on the bistable solenoid valve.

7. The operating method as claimed in claim 6, further comprising:
   opening the bistable solenoid valve from the currentless closed position with the hydraulic force in response to the enclosed brake pressure exceeding a predefined first threshold value so as to implement a positive pressure function and bring about a pressure equalization.

8. The operating method as claimed in claim 7, wherein the first threshold value corresponds to a maximum permitted enclosed brake pressure in the corresponding wheel brake, which is defined by a predefined spring force produced by a spring and acting in a closing direction of the bistable solenoid valve counter to the hydraulic force, the predefined spring force corresponding to a hydraulic force of the maximum permitted enclosed brake pressure and the predefined spring force being based on the enclosed brake pressure and a sealing diameter of a corresponding valve seat of the bistable solenoid valve.

9. The operating method as claimed in claim 6, further comprising:
   measuring the brake pressure which is enclosed in the wheel brake.

10. The operating method as claimed in claim 9, further comprising:
    activating a fluid pump and opening the bistable solenoid valve to build up brake pressure in the corresponding wheel brake if in response to the enclosed brake pressure dropping below a predefined second threshold value.

11. A hydraulic brake system for a vehicle, comprising:
    a brake master cylinder;
    a plurality of wheel brakes;
    a hydraulic unit comprising at least one brake circuit configured to modulate brake pressure in the wheel brakes; and
    a bistable solenoid valve assigned to at least one wheel brake of the plurality of wheel brakes, the bistable solenoid valve looped into a corresponding fluid duct directly upstream of the associated wheel brake and, in a currentless open position, the bistable solenoid valve enables the brake pressure modulation in the associated wheel brake and, in a currentless closed position, the bistable solenoid valve encloses a current brake pressure in the associated wheel brake,
    wherein a hydraulic force which is brought about by way of the enclosed brake pressure has a seat-opening effect in the bistable solenoid valve, and
    wherein the hydraulic brake system has a negative pressure function which opens the bistable solenoid valve in the currentless closed position, and brings about a pressure build-up in the corresponding wheel brake via a fluid pump if the brake pressure which is enclosed in the corresponding wheel brake undershoots a predefined second threshold value.

* * * * *

UNITED STATES PATENT AND TRADEMARK OFFICE
CERTIFICATE OF CORRECTION

PATENT NO. : 11,491,962 B2
APPLICATION NO. : 16/770258
DATED : November 8, 2022
INVENTOR(S) : Stahr et al.

Page 1 of 1

It is certified that error appears in the above-identified patent and that said Letters Patent is hereby corrected as shown below:

In the Claims

In Claim 10, at Column 8, Line 32: "wheel brake if in response to" should read --wheel brake in response to--.

Signed and Sealed this
Twenty-third Day of May, 2023

Katherine Kelly Vidal
*Director of the United States Patent and Trademark Office*